US012700399B2

(12) United States Patent
Hwang

(10) Patent No.: US 12,700,399 B2
(45) Date of Patent: Aug. 4, 2026

(54) METHOD AND APPARATUS FOR TRAINING ENCODER

(71) Applicants: HYUNDAI MOTOR COMPANY, Seoul (KR); KIA CORPORATION, Seoul (KR)

(72) Inventor: Sung Woong Hwang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 128 days.

(21) Appl. No.: 18/635,857

(22) Filed: Apr. 15, 2024

(65) Prior Publication Data

US 2025/0029599 A1 Jan. 23, 2025

(30) Foreign Application Priority Data

Jul. 17, 2023 (KR) ........................ 10-2023-0092490
Mar. 18, 2024 (KR) ........................ 10-2024-0037375

(51) Int. Cl.
*G10L 15/06* (2013.01)
*G10L 13/08* (2013.01)
(52) U.S. Cl.
CPC ............ *G10L 15/063* (2013.01); *G10L 13/08* (2013.01)
(58) Field of Classification Search
CPC ..................... G10L 13/08; G10L 2013/105
See application file for complete search history.

(56) References Cited

U.S. PATENT DOCUMENTS

| | | | | |
|---|---|---|---|---|
| 11,978,431 | B1* | 5/2024 | Joly | .................... G10L 13/0335 |
| 2020/0380949 | A1* | 12/2020 | Wu | ........................ G06N 3/0442 |
| 2022/0108680 | A1* | 4/2022 | Zhang | ..................... G10L 13/10 |
| 2022/0189455 | A1* | 6/2022 | Pekar | ...................... G10L 13/10 |
| 2023/0056128 | A1* | 2/2023 | Zhang | ...................... G10L 13/10 |
| 2024/0087558 | A1* | 3/2024 | Oplustil Gallegos | ... G10L 13/08 |
| 2024/0105160 | A1* | 3/2024 | Kim | ....................... G10L 13/047 |
| 2024/0161727 | A1* | 5/2024 | Song | ....................... G10L 13/08 |
| 2024/0161730 | A1* | 5/2024 | Elias | ........................ G10L 13/08 |
| 2024/0233706 | A1* | 7/2024 | Tan | ........................ G10L 13/047 |
| 2025/0149019 | A1* | 5/2025 | Tasnima | .................. G10L 13/08 |

OTHER PUBLICATIONS

Li, Naihan, et al. "Neural speech synthesis with transformer network." Proceedings of the AAAI conference on artificial intelligence. vol. 33. No. 01. 2019. (Year: 2019).*
Peng, Yukun, and Zhenhua Ling. "Decoupled pronunciation and prosody modeling in meta-learning-based multilingual speech synthesis." arXiv preprint arXiv:2209.06789 (2022). (Year: 2022).*

(Continued)

*Primary Examiner* — Brian L Albertalli
(74) *Attorney, Agent, or Firm* — Fish & Richardson P.C.

(57) ABSTRACT

A method and an apparatus for training a speech transformation model are provided. The method and the apparatus are capable of generating a natural speech suitable for context and improving accuracy of pronunciation by training the first encoder (e.g., a encoder of the flow-based model) and the second encoder (e.g., a encoder of the Tacotron 2 model) in parallel.

18 Claims, 4 Drawing Sheets

(56)        References Cited

OTHER PUBLICATIONS

Sanjay, G., K. C. Sooraj, and Deepak Mishra. "Natural text-to-speech synthesis by conditioning spectrogram predictions from transformer network on waveglow vocoder." 2020 7th International Conference on Soft Computing & Machine Intelligence (ISCMI). IEEE, 2020. (Year: 2020).*

Kim, Jaehyeon, et al. "Glow-tts: A generative flow for text-to-speech via monotonic alignment search." Advances in Neural Information Processing Systems 33 (2020): 8067-8077. (Year: 2020).*

Kim et al., "Conditional Variational Autoencoder with Adversarial Learning for End- to-End Text-to-Speech," Proceedings of the 38th International Conference on Machine Learning, PMLR 139, 2021, 12 pages.

Min et al., "Meta-StyleSpeech : Multi-Speaker Adaptive Text-to-Speech Generation," Proceedings of the 38th International Conference on Machine Learning, PMLR 139, 2021, 13 pages.

Shen et al., "Natural TTS Synthesis by Conditioning Wavenet on MEL Spectrogram Predictions," 2018 IEEE International Conference on Acoustics, Speech and Signal Processing (ICASSP), 2018, 6 pages.

* cited by examiner

-Prior Art-

-Prior Art-

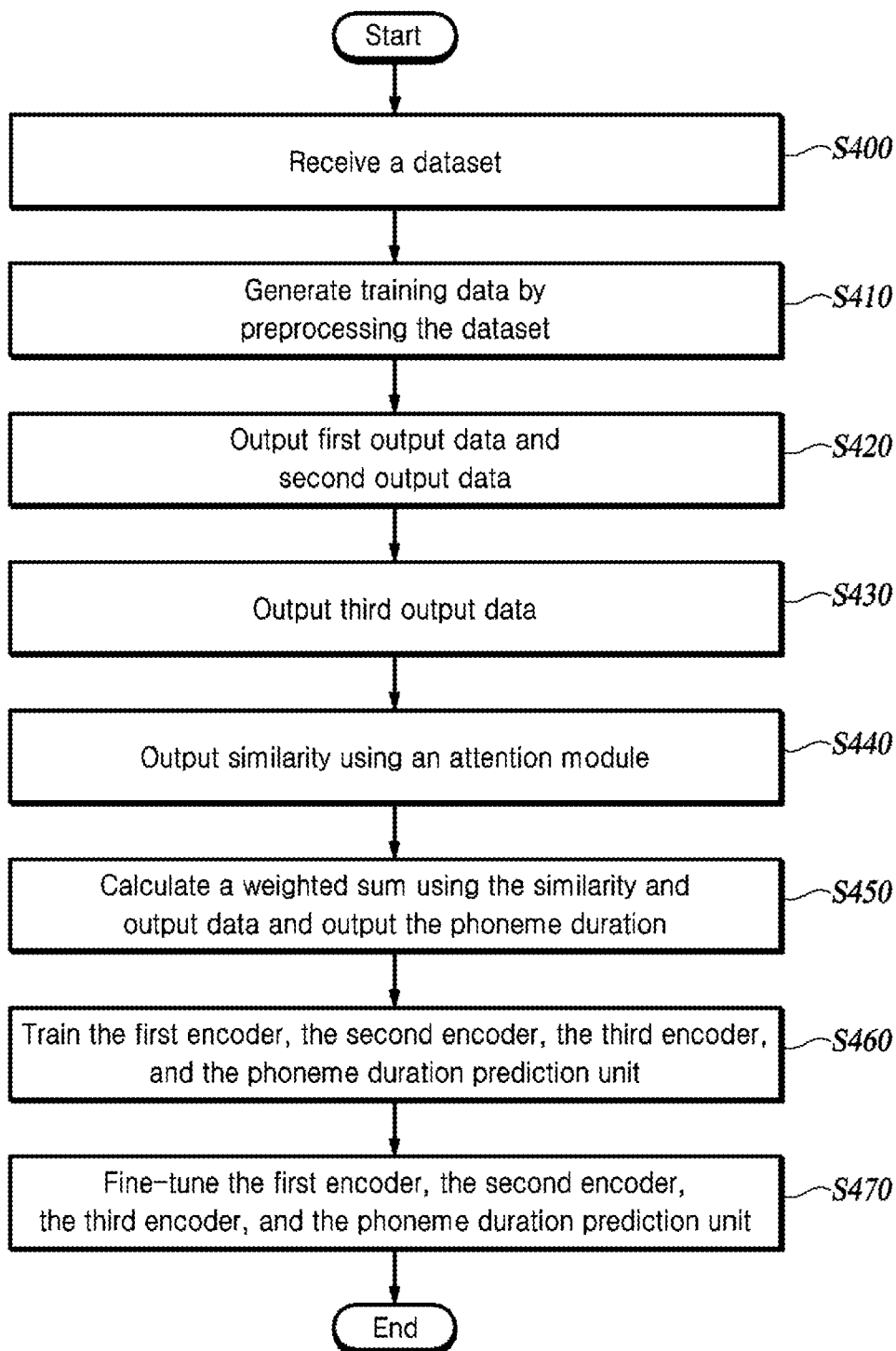

Start

Receive a dataset ～S400

Generate training data by
preprocessing the dataset ～S410

Output first output data and
second output data ～S420

Output third output data ～S430

Output similarity using an attention module ～S440

Calculate a weighted sum using the similarity and
output data and output the phoneme duration ～S450

Train the first encoder, the second encoder, the third encoder,
and the phoneme duration prediction unit ～S460

Fine-tune the first encoder, the second encoder,
the third encoder, and the phoneme duration prediction unit ～S470

End

*FIG. 4*

METHOD AND APPARATUS FOR TRAINING ENCODER

CROSS REFERENCE TO RELATED APPLICATION

The present application claims priority to Korean Patent Application No. 10-2023-0092490, filed Jul. 17, 2023, and Korean Patent Application No. 10-2024-0037375, filed Mar. 18, 2024, the entire contents of which are incorporated herein for all purposes by this reference.

TECHNICAL FIELD

The present disclosure relates to a method and apparatus for training an encoder. More specifically, the present disclosure relates to a method and apparatus for training an encoder to improve the pronunciation within a speech synthesis system.

BACKGROUND

Text-to-speech (TTS) is a technology that converts text into speech using a computer. TTS was developed to improve user accessibility in situations where conveying information through text is difficult. For instance, when driving a vehicle, the driver needs to focus on the road, making it difficult to access information presented in the form of text. Therefore, it is necessary to provide information to the driver using TTS.

With the development of artificial intelligence, a TTS model using artificial intelligence or an artificial neural network is being developed. A TTS model using an artificial neural network includes an encoder, an attention, and a decoder. TTS models are distinguished from each other according to the structures of employed encoders and decoders.

FIG. 1 shows an encoder of the conventional flow-based model.

Referring to FIG. 1, an encoder of the conventional flow-based model includes multi-head self-attention 100, a plurality of residual connections and layer normalizations 110, and feed-forward neural networks (FFNNs) 120.

An example of the conventional flow-based model is a Glow-TTS model. The Glow-TTS model has a structure similar to the encoder of a transformer model. A flow-based model is trained such that finding the similarity between phonemes in a sentence. Therefore, the flow-based model provides an advantage in that it enables generation of natural speech suitable for the context. However, the flow-based model has a problem in that accuracy of pronunciation is low.

FIG. 2 shows an encoder of the conventional Tacotron 2 model.

Referring to FIG. 2, the encoder of Tacotron 2 model includes an embedding matrix 200, a plurality of convolutional neural networks (CNNs) and batch normalizations 210, and an LSTM 220.

TTS employing the Tacotron 2 model generates a speech with superior pronunciation accuracy than the flow-based model. However, one drawback of the Tacotron 2 model is that the generated speech may not sound natural. Therefore, an encoder training method is needed to address the drawback while maintaining the advantages of the flow-based model and the Tacotron 2 model.

SUMMARY

The present disclosure is directed to an encoder training method for TTS capable of generating a natural speech suitable for context and improving accuracy of pronunciation. The present disclosure is also directed to an encoder training method robust to Korean phonemes.

The present disclosure is also directed to a training method based on multilingual phoneme embedding that may be extended to various languages.

According to an aspect of the present disclosure, a computer implement method for training a speech transformation model, which includes a first encoder, a second encoder, a third encoder, one or more attention modules, and a phoneme duration prediction unit, using training data including text and speech includes generating first output data from text of the training data using the first encoder, the first output data representing features of the text; generating second output data from text of the training data using the second encoder, the second output data representing features of the text; generating third output data from speech of the training data using the third encoder, the third output data representing features of the speech; generating a first similarity from the first output data and the third output data using the one or more attention modules and generating a second similarity from the second output data and the third output data, wherein the first similarity and the second similarity are similarity between features of the text and the speech; generating predicted phoneme duration of the text from the first similarity, the second similarity, the first output data, and the second output data using the phoneme duration prediction unit; and updating one or more parameters of the speech transformation model based on a loss function to which the at least one of the first output data, the second output data, or the third output data are applied.

According to another aspect of the present disclosure, an apparatus for training a speech transformation model, which includes a first encoder, a second encoder, a third encoder, one or more attention modules, and a phoneme duration prediction unit, includes a memory storing instructions; and at least one or more processors, wherein the processor is configured to execute the instructions to: generate first output data from text of training data using the first encoder, the first output data representing features of the text; generate second output data from text of the training data using the second encoder, the second output data representing features of the text; generate third output data from speech of the training data using the third encoder, the third output data representing features of the speech; generate a first similarity from the first output data and the third output data using the one or more attention modules and generate a second similarity from the second output data and the third output data, wherein the first similarity and the second similarity are similarity between features of the text and the speech; generate predicted phoneme duration of the text from the first similarity, the second similarity, the first output data, and the second output data using the phoneme duration prediction unit; and update one or more parameters of the speech transformation model based on a loss function to which the at least one of the first output data, the second output data, or the third output data are applied.

In some implementations, an encoder training method for TTS capable of generating a natural speech suitable for context and improving accuracy of pronunciation includes training the first encoder (e.g., a encoder of the flow-based model) and the second encoder (e.g., a encoder of the Tacotron 2 model) in parallel.

In some examples, an encoder training method robust to Korean phonemes includes performing fine-tuning using a Korean dataset.

In some implementations, an encoder training method based on multilingual phoneme embedding which may be extended to various languages includes training the encoder using language embedding and datasets of various languages.

BRIEF DESCRIPTION OF THE DRAWINGS

FIG. 4 is a flow diagram illustrating an example of a process in which a speech transformation model is trained.

DETAILED DESCRIPTION

Figure 3:
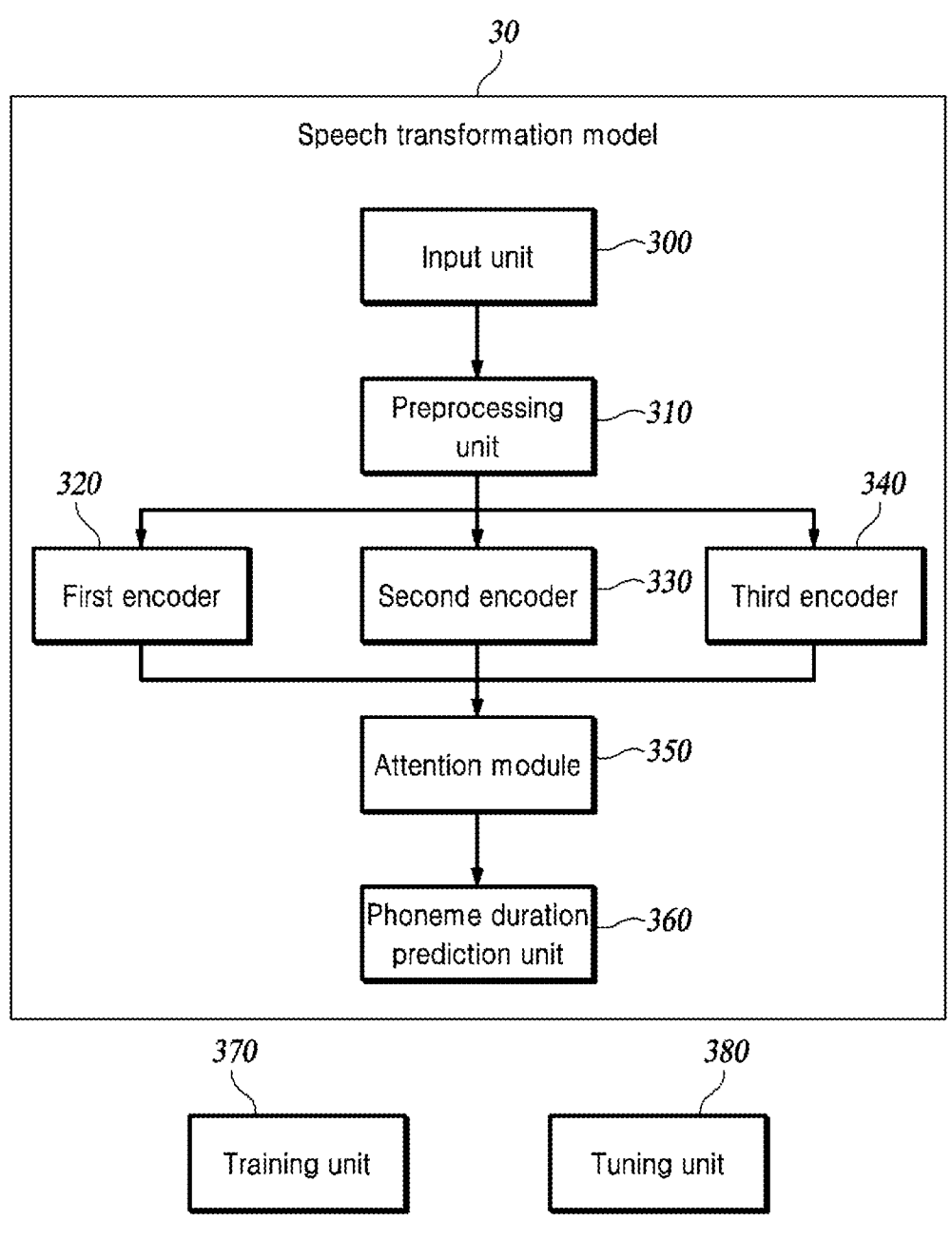
FIG. 3 is a block diagram illustrating an example of a speech transformation model.

FIG. 3 is a block diagram illustrating an example of a speech transformation model.

Referring to FIG. 3, the encoder training apparatus may include all or part of a speech transformation model 30, a training unit 370, and a tuning unit 380. The speech transformation model 30 may include all or part of a preprocessing unit 310, a first encoder 320, a second encoder 330, a third encoder 340, an attention module 350, and a phoneme duration prediction unit 360. The constituting elements shown in FIG. 3 represent functionally distinct elements, and at least one constituting element may be implemented in a form integrated with another element in an actual physical environment. The encoder training apparatus may be implemented by using one or more controllers (e.g., one or more processors), and/or memory storing instructions that, when executed by the one or more controllers, cause a computing device to perform one or more operations described herein.

Each of the constituting elements of FIG. 3 may include an artificial neural network. An artificial neural network may include, but not limited to, a recurrent neural network (RNN), a feed-forward neural network (FFNN), or a convolutional neural network (CNN).

The speech transformation model 30 receives a dataset. Here, a dataset refers to a group of data including a speech and text corresponding to the speech for training a text-to-speech (TTS) model. The speech and text included in the dataset may be represented various languages. For example, the speech transformation model 300 may receive a multilingual dataset represented various languages such as Korean, English, Japanese, French, Chinese, and German. The languages supported by the dataset are only examples for describing the present disclosure, and the dataset may further include various other languages without being limited to the specific examples. Speech included in the dataset may be in the form of a speech signal, a mel-spectrogram, and/or a linear scale spectrogram. A mel-spectrogram or a linear scale spectrogram represents a speech signal using frequency and amplitude as the signal varies with time. In some implementations, the speech signal may be referred as a speech waveform.

The preprocessing unit 310 preprocesses text included in the received dataset to generate training data. The preprocessing unit 310 decomposes the text into phoneme units. A phoneme represents the smallest unit of sound recognized by a language user.

The preprocessing unit 310 one-hot encodes the decomposed phoneme. One-hot encoding is an encoding method that represents data using the positions of Os and Is in a certain matrix. In other words, one-hot encoding may be used to convert phoneme data into numeric data. Since one-hot encoding is a method already known to the public, a detailed description thereof will be omitted.

The preprocessing unit 310 performs character embedding on the one-hot encoded phonemes. Character embedding refers to the process of converting each character into a corresponding vector. The one-hot encoded phoneme is converted into a vector with a dimension suitable for training using character embedding.

The process of performing character embedding may include a process of performing position encoding. Position encoding is a method of adding position information of a specific word included in the input text to a vector obtained by performing the character embedding. The character embedding and position-encoded vectors include information on the position of each word in the input sentence. In some implementations, the preprocessing unit 310 may perform absolute position encoding or relative position representation.

The preprocessing unit 310 outputs training data. Here, training data refers to the data obtained by performing all or part of one-hot encoding, character embedding, and position embedding on the text.

The first encoder 320 and the second encoder 330 receive training data, extract text features from the training data, and outputs data that include feature vectors from the features, respectively. Here, the data output from the first encoder 320 are referred to as first output data, and the data output from the second encoder 330 are referred to as second output data. In other words, the first output data and the second output data may include features extracted from the text.

Figure 1:
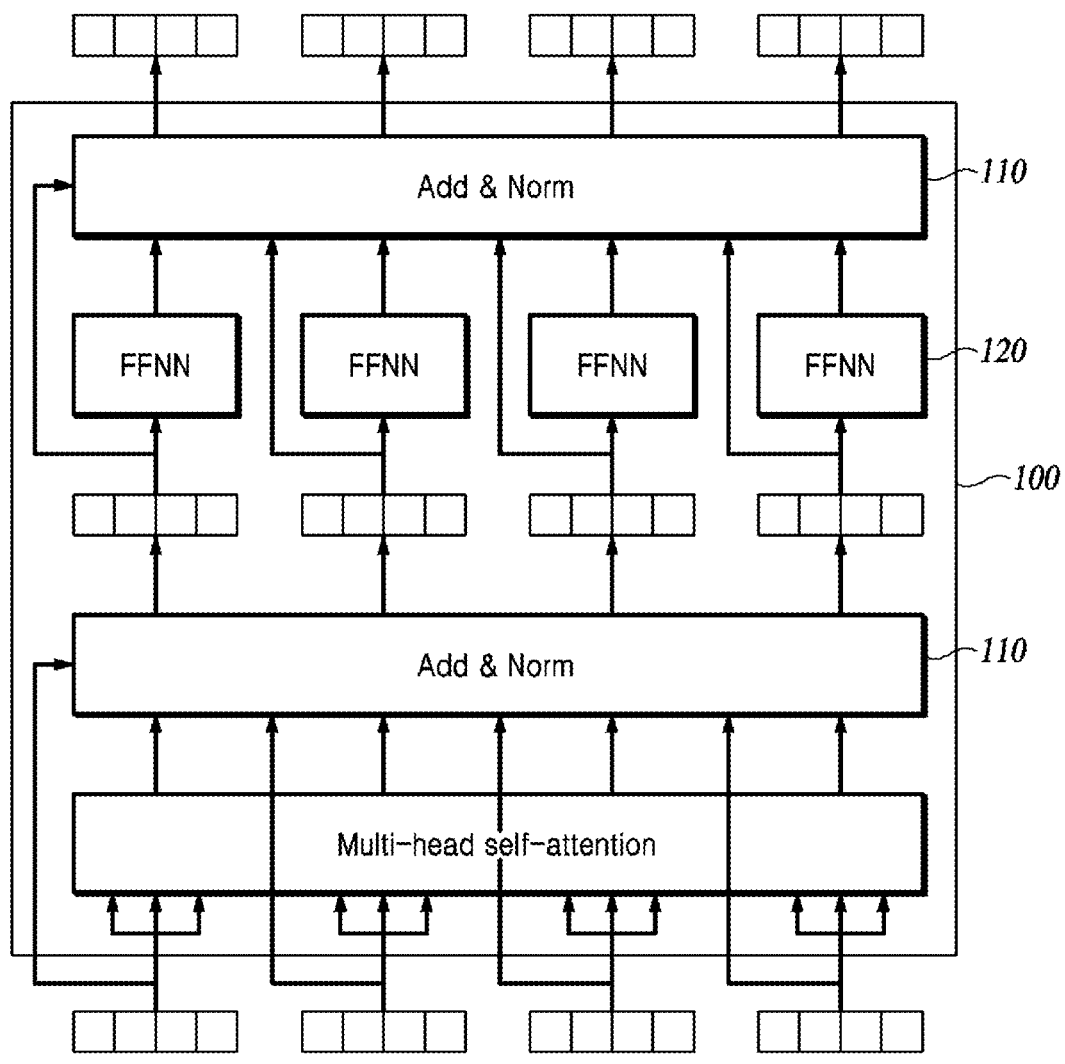
FIG. 1 shows an encoder of the conventional flow-based model.
Figure 2:
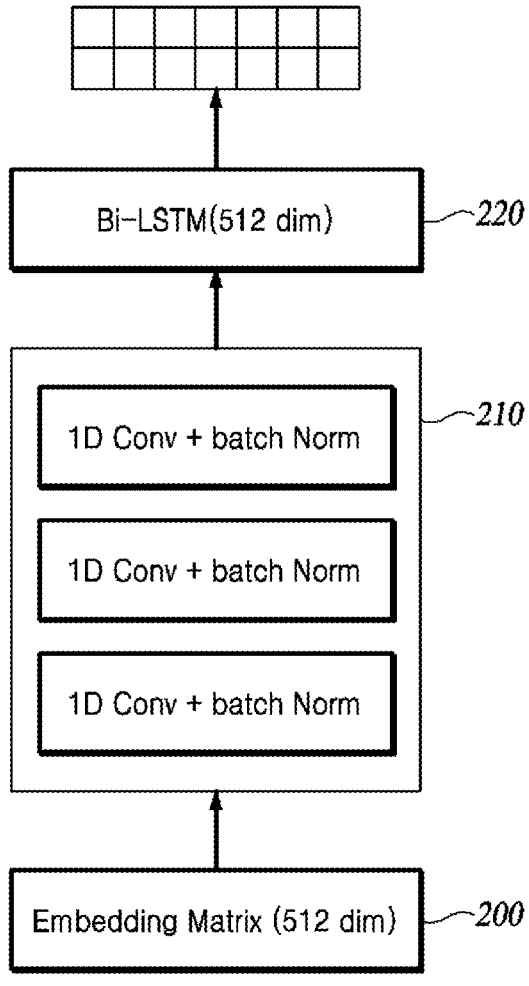
FIG. 2 shows an encoder of the conventional Tacotron 2 model.

The first encoder 320 may include an encoder included in the flow-based model shown in FIG. 1. For example, the first encoder 320 may be an encoder included in a transformer model. The second encoder 330 may be an encoder included in the Tacotron 2 model shown in FIG. 2.

The first encoder 320 may include Style-Adaptive Layer Normalization (in what follows, "SALN") instead of layer normalization 110. SALN is a normalization method for adaptively shifting or scaling the gain or bias of normalized input features based on a style vector. Since SALN is already known to the public, a detailed description thereof will be omitted. In the SALN according to the present disclosure, gain or bias changes according to language features. Compared to SALN, the gain or bias of layer normalization included in the first encoder 320 is fixed. In other words, the gain or bias of layer normalization has a specific value suitable for training.

The second encoder 330 may include SALN instead of batch normalization 210. Compared to SALN, the gain or bias of batch normalization is fixed. In other words, the gain or bias of batch normalization has a specific value suitable for training.

SALN is robust to various languages compared to layer normalization and batch normalization.

The first encoder 320 and the second encoder 330 perform language embedding. Language embedding refers to a process of expressing information on the language included in a dataset as a vector form. By performing language embedding, the first output data and the second output data may include information on which language is included in the input data. Also, by performing language embedding, the first output data and the second output data may include information related to specific language used to output each value included in the first output data and the second output data.

The third encoder 340 receives a speech included in the dataset and extracts feature data of the speech. The speech feature data includes latent variables and prior distributions of latent variables. The third encoder 340 can include, for example, a non-casual WaveNet residual block.

The third encoder 340 transforms the prior distribution included in the speech feature data. The third encoder 340 may transform the prior distribution included in the speech feature data using a Normalizing flow function. The third encoder 340 generates a result obtained by applying the speech feature data to the normalizing flow function as third output data. The third encoder 340 may be a flow-based model having reversibility. For example, the third encoder 340 converts a speech (i.e., a speech label) included in the dataset into a latent variable(s) in the training process, while the third encoder 340 may convert a latent variable(s) into a speech in the inference process.

The speech transformation model 30 can include at least one attention module 350. One attention module 350 receives at least one or more of first output data, second output data, and third output data. In some implementations, the first attention module receives the first output data and the third output data, and the second attention module receives the second output data and the third output data.

The attention module 350 calculates the similarity between a speech and text using output data. Here, the similarity is a value related to which part of the text is similar to which part of the speech. Each of a plurality of attention modules 350 generates a similarity between speech data and text by reflecting the respective characteristics of the first encoder 320 and the second encoder 330. The similarity generated by the first attention model is referred to as a first similarity, and the similarity generated by the second attention model is referred to as a second similarity.

According to position encoding in the preprocessing unit 310, the first output data and the second output data may include information related to the position of each phoneme. The attention module 350 may calculate the similarity between each phoneme included in the text and each phoneme included in a speech based on the position of each phoneme included in the text. In other words, the text and the speech may be aligned with each other.

The attention module 350 may output the similarity in the form of a vector or a matrix. In some implementations, the similarity may be expressed as a probability. Alternatively, the similarity may be expressed as an attention score. The similarity may include information on the length of each phoneme included in the text and the speech. The attention module 350 according to the present disclosure may include various types of attention network.

The phoneme duration prediction unit 360 may apply weights to the first output data and the second output data, respectively. The weights may be calculated using similarity. In other words, the phoneme duration prediction unit 360 may calculate the weighted sum by summing the first output data with a weight based on the first similarity and the second output data with a weight based on to the second similarity.

The phoneme duration prediction unit 360 predicts the duration of a phoneme included in the text based on the weighted sum. In other words, the phoneme duration prediction unit 360 generates and outputs the predicted phoneme duration of the text based on the weighted sum.

The training unit 370 trains the speech transformation model 30 using at least one or more of the phoneme durations predicted by the phoneme duration prediction unit 360, the first output data, the second output data, and the third output data. More specifically, the training unit 370 may apply at least one or more of the first output data, the second output data, and the third output data to a loss function and update at least one or more of at least one or more parameters among the first encoder 320, the second encoder 330, the third encoder 340, and the phoneme duration prediction unit 360 in the direction in which the loss function is decreased. As an example, the training unit 370 may update parameters of the speech transformation model 30 to minimize the difference between latent variables (or their distribution) converted from the speech label and latent variables (or their distribution) from converted from the text. The distribution of latent variables from the speech label, for example, may be determined based on the third output data. The distribution of latent variables from the text, for example, may be determined based on the first output data, second output data, and/or their weighted sum. As another example, the training unit 370 may update parameters of the speech transformation model 30 to minimize the difference between phoneme durations predicted by the duration prediction unit 360 and phoneme durations calculated form the speech label. Monotonic alignment search (MAS) may be used to align latent variables and/or to calculate the phoneme durations for the speech label, but is not limited to these examples. In some implementations, phoneme durations label for the speech label may be included in the training dataset. In the meantime, when the speech transformation model 30 further includes a separate decoder, the training unit 370 may update the parameters of the speech transformation model 30 further based on the loss between the speech label and the speech generated by the decoder.

The tuning unit 380 fine-tunes the speech transformation model 30. The tuning unit 380 may fine-tune the speech transformation model 30 by using a dataset of a language that is not used for pre-training. For example, if the training data (i.e., text-answer voice pair) on Korean is limited, the speech transformation model 30 may be pre-trained based on other languages dataset (e.g., English dataset, Japanese dataset, Chinese dataset, French dataset, and German dataset) having a large amount of training data and then be fine-tuned based on the Korean dataset. Here, fine-tuning is a technique for tuning a pre-trained model by using a training process that update only a portion of the parameters of a pre-trained model. Since only a portion of the parameters are tuned from the pre-trained model, it takes less time for fine-tuning. By performing fine-tuning, the performance of a model may be improved. The tuning unit 380 may perform fine-tuning using layer normalization. For example, the tuning unit 380 may replace the SALN of the first encoder 320 and the second encoder 330 with layer normalization before the fine-tuning.

The tuning unit 380 may perform fine-tuning by inputting a Korean dataset to the first encoder 320, the second encoder 330, and the third encoder 340.

Although FIG. 3 shows only one first encoder 320, one second encoder 330, one third encoder 340, and one attention module 350, the speech transformation model 30 according to the present disclosure may include a plurality of first encoders 320, second encoders 330, third encoders 340, and attention modules 350.

FIG. 4 is a flow diagram illustrating an example of a process in which an encoder training apparatus trains a speech transformation model.

Referring to FIG. 4, the speech transformation model 30 receives a dataset S400. The dataset may include various languages. For example, the dataset may include all or part of Korean, English, Japanese, Chinese, French, and German languages.

The preprocessing unit 310 preprocesses a received dataset to generate training data (S410). The preprocessing unit 310 decomposes the dataset into phoneme units. The preprocessing unit 310 one-hot encodes the text from the dataset decomposed into phoneme units. The preprocessing unit 310 performs character embedding on the one-hot encoded dataset. The preprocessing unit 310 may position encodes the character embedded dataset. The dataset which has gone through the preprocessing process is converted into a vector with a dimension suitable for training. The preprocessing unit 310 outputs training data. The training data may be expressed in the form of a vector.

The first encoder 320 and the second encoder 330 receives the training data. The first encoder 320 and the second encoder 330 may be an encoder including the SALN. The first encoder 320 and the second encoder 330 may output first output data and second output data, which include feature vectors of text, respectively (S420). The first encoder 320 and the second encoder 330 may perform language embedding on the output data. In other words, the first encoder 320 and the second encoder 330 receive the training data, extract features of the text, perform language embedding to the extracted features, and finally output the data for which language embedding has been applied as the first output data and the second output data.

The third encoder 340 receives the training data. The third encoder 340 extracts features from speech data from a received dataset and outputs third output data by transforming a prior distribution of the extracted features (S430). The third output data includes latent variables obtained by transforming the prior distribution. The third output data may be the data obtained by transforming the prior distribution by the Normalizing flow function.

The attention module 350 receives the first output data or the second output data, and the third output data. In other words, the attention module receives the first output data and the third output data; and the second output data and the third output data, respectively. The attention module 350 calculates and outputs the similarity using the received data (S440). The attention module 350 may output the similarity in the form of a vector or a matrix.

The phoneme duration prediction unit 360 calculates weights using the similarity. The phoneme duration prediction unit 360 calculates a weighted sum by multiplying the first output data and the second output data by the respective weights. The phoneme duration prediction unit 360 predicts the duration of phonemes in the text using the weighted sum (S450). In other words, the phoneme duration prediction unit 360 predicts the duration of a phoneme by receiving data obtained by adding the respective weights to the first output data and the second output data.

The training unit 370 trains at least one or more of the first encoder 320, the second encoder 330, the third encoder 340, and the phoneme duration prediction unit 360 using the outputs of the first encoder 320, the second encoder 330, the third encoder 340, and the phoneme duration prediction unit 360 (S460).

The tuning unit 380 fine-tunes at least one or more of the first encoder 320, the second encoder 330, the third encoder 340, and the phoneme duration prediction unit 360 (S470). The tuning unit 380 may fine-tune the first encoder 320, the second encoder 330, the third encoder 340, and the phoneme duration prediction unit 360 using layer normalization.

Although the flow diagram of FIG. 4 assumes that the steps S400 to S470 are sequentially executed, training of the encoder does not necessarily have to be performed in the order described in FIG. 4. For example, although FIG. 4 shows that the S430 step is performed after the S420 step, the order of the S420 and S430 steps may be changed, or both the steps may be performed simultaneously.

The first encoder 320 and the second encoder 330 can be trained using SALN. Therefore, the encoders become robust to various languages. The first encoder 320, the second encoder 330, and the phoneme duration prediction unit 360 fine-tuned using a Korean dataset have a characteristic robust to Korean language. The first encoder 320, the second encoder 330, and the phoneme duration prediction unit 360 trained according to the present disclosure may be used for a TTS apparatus or a TTS method. For example, a speech may be generated from text using the trained first encoder 320, second encoder 330, and phoneme duration prediction unit 360 instead of the text encoder and phoneme duration prediction unit of a flow-based TTS model.

Each element of the apparatus or method according to the present disclosure may be implemented in hardware, software, or a combination of hardware and software. Further, the function of each element may be implemented in software, and the microprocessor may be implemented to execute the function of software corresponding to each element.

Various implementations of the systems and techniques described herein can be realized by digital electronic circuitry, integrated circuitry, FPGAs (field programmable gate arrays), ASICs (application specific integrated circuits), computer hardware, firmware, software, and/or combinations thereof. These various implementations can include implementation in one or more computer programs that are executable on a programmable system. The programmable system includes at least one programmable processor (which may be a special-purpose processor or a general-purpose processor) coupled to receive data and instructions from, and transmit data and instructions to, a storage system, at least one input device, and at least one output device. Computer programs (also known as programs, software, software applications or code) contain instructions for a programmable processor and are stored on a "computer-readable recording medium".

The computer-readable recording medium includes all or some types of recording devices in which data readable by a computer system is stored. These computer-readable recording media may include non-volatile or non-transitory media, such as ROM, CD-ROM, magnetic tape, floppy disk, memory card, hard disk, magneto-optical disk, and storage device, and may further include transitory media such as data transmission media. In addition, the computer-readable recording medium may be distributed in network-connected computer systems, and computer-readable codes may be stored and executed in a distributed manner.

What is claimed is:

1. A computer implement method for training a speech transformation model, which includes a first encoder, a second encoder, a third encoder, one or more attention modules, and a phoneme duration prediction unit, using dataset including text and speech, the method comprising:

generating, using the first encoder, first output data from training data generated by preprocessing the text, the first output data related to first features of the text;

generating, using the second encoder, second output data from the training data generated by preprocessing the text, the second output data related to second features of the text;

generating, using the third encoder, third output data from the speech corresponding to the text, the third output data related to features of the speech;

generating, using the one or more attention modules, (i) a first similarity from the first output data and the third output data and (ii) a second similarity from the second output data and the third output data, the first similarity and the second similarity representing similarities between the first and second features of the text and the features of the speech;

generating, using the phoneme duration prediction unit, a predicted phoneme duration of the text based on a weighted sum of the first output data with a weight based on the first similarity and the second output data with a weight based on the second similarity; and updating one or more parameters of the speech transformation model based on a loss function to which the at least one of the first output data, the second output data, or the third output data are applied.

2. The method of claim 1, further comprising:

refining the speech transformation model using a dataset of a language not used for the training of the speech transformation model.

3. The method of claim 1, wherein the first encoder is an encoder of a transformer model configured to perform text-to-speech conversion, and the second encoder is an encoder of Tacotron 2 model configured to perform text-to-speech conversion.

4. The method of claim 1, wherein the first encoder and the second encoder are configured to generate the first output data and the second output data based on style-adaptive layer normalization (SALN).

5. The method of claim 1, wherein the similarity is related to information regarding alignment of the text and the speech.

6. The method of claim 1, wherein generating the first output data and the second output data comprises:

extracting text features from the training data, and performing language embedding indicating received language on the extracted text features for output data generation.

7. The method of claim 1, wherein the training data is obtained by performing at least one of one-hot encoding, character embedding, or position encoding to a dataset.

8. The method of claim 1, wherein the speech transformation model further includes a decoder configured to generate a synthetic speech from the third output data; and wherein the updating includes updating one or more parameters of the speech transformation model further based on a loss between the speech of the training data and the synthetic speech.

9. The method of claim 1, wherein the first encoder and the second encoder are configured to generate the first output data and the second output data based on style-adaptive layer normalization (SALN) during the updating, wherein the method further comprises:

replacing the SALN of the first encoder and the second encoder with layer normalization after the updating; and refining the speech transformation model using a dataset of a language different from languages used for the updating.

10. An apparatus for training a speech transformation model including a first encoder, a second encoder, a third encoder, one or more attention modules, and a phoneme duration prediction unit, the apparatus comprising:

a memory storing instructions; and at least one or more processors configured to execute the instructions to perform operations comprising:

generating, using the first encoder, first output data from training data generated by preprocessing a text, the first output data related to first features of the text;

generating, using the second encoder, second output data from the training data generated by preprocessing the text of the training data, the second output data related to second features of the text;

generating, using the third encoder, third output data from speech corresponding to the text, the third output data related to features of the speech;

generating, using the one or attention modules, (i) a first similarity from the first output data and the third output data and (ii) a second similarity from the second output data and the third output data, the first similarity and the second similarity representing similarities between the first and second features of the text and the features of the speech;

generating, using the phoneme duration prediction unit, a predicted phoneme duration of the text based on a weighted sum of the first output data with a weight based on the first similarity and the second output data with a weight based on the second similarity; and updating one or more parameters of the speech transformation model based on a loss function to which the at least one of the first output data, the second output data, or the third output data are applied.

11. The apparatus of claim 10, wherein the operations further comprise refining the speech transformation model using a dataset of a language not used for the training of the speech transformation model.

12. The apparatus of claim 10, wherein the first encoder is an encoder of a transformer model configured to perform text-to-speech conversion, and the second encoder is an encoder of Tacotron 2 model configured to perform text-to-speech conversion.

13. The apparatus of claim 10, wherein the first encoder and the second encoder are configured to generate the first output data and the second output data based on style-adaptive layer normalization (SALN).

14. The apparatus of claim 10, wherein the similarity is related to information regarding alignment of the text and the speech.

15. The apparatus of claim 10, wherein generating the first output data and the second output data include;

extracting text features form the training data; and performing language embedding indicating received language on the extracted text features for output data generation.

16. The apparatus of claim 10, wherein the training data is obtained by performing at least one of one-hot encoding, character embedding, or position encoding to a dataset.

17. The apparatus of claim 10, wherein the speech transformation model further includes a decoder configured to generate a synthetic speech from the third output data; and wherein the updating includes updating one or more parameters of the speech transformation model further based on a loss between the speech of the training data and the synthetic speech.

18. The apparatus of claim 10, wherein the first encoder and the second encoder are configured to generate the first output data and the second output data based on style-adaptive layer normalization (SALN) during the updating wherein the operations further comprise:

replacing the SALN of the first encoder and the second encoder with layer normalization after the updating; and refining the speech transformation model using a data set of a language different from languages used for updating.

* * * * *